May 25, 1965  S. W. COLE  3,184,914
THERMAL MOTOR FOR ROTATING A ROTISSERIE SHAFT
Filed Dec. 20, 1960  2 Sheets-Sheet 1
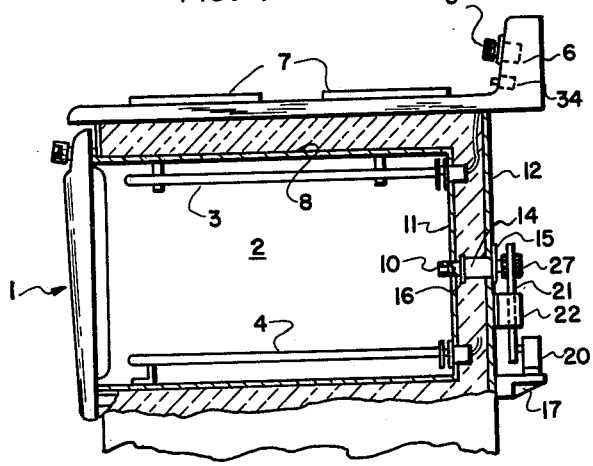
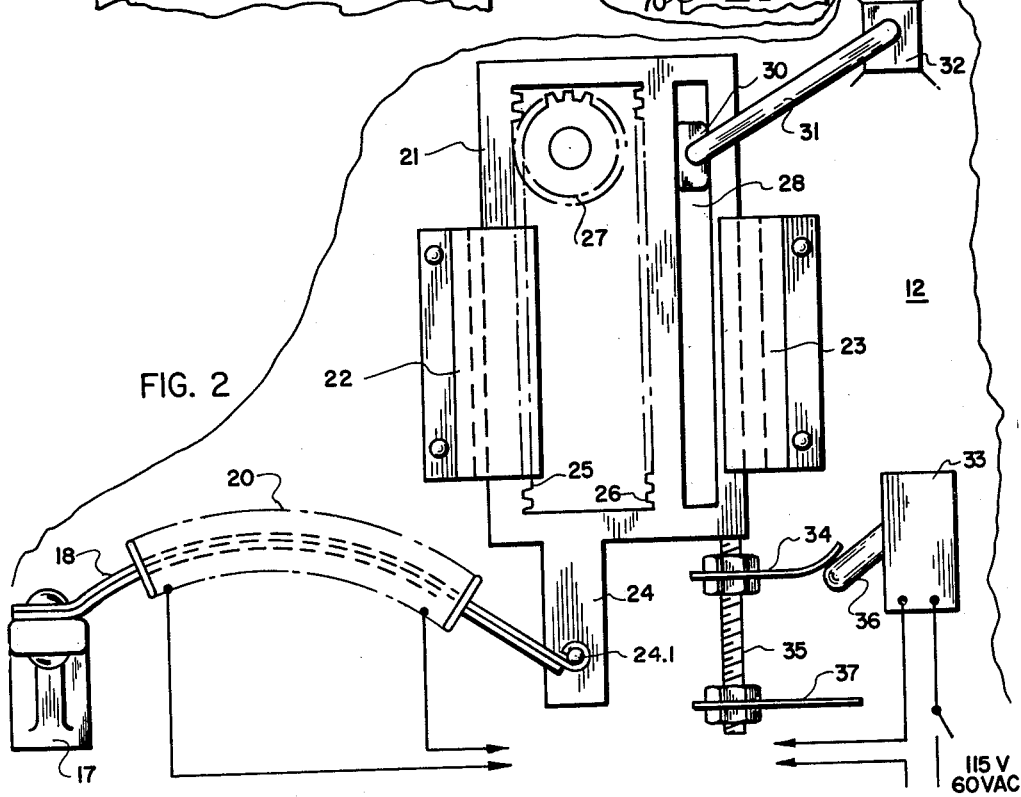
INVENTOR.
SAMUEL W. COLE
BY
ATTORNEY

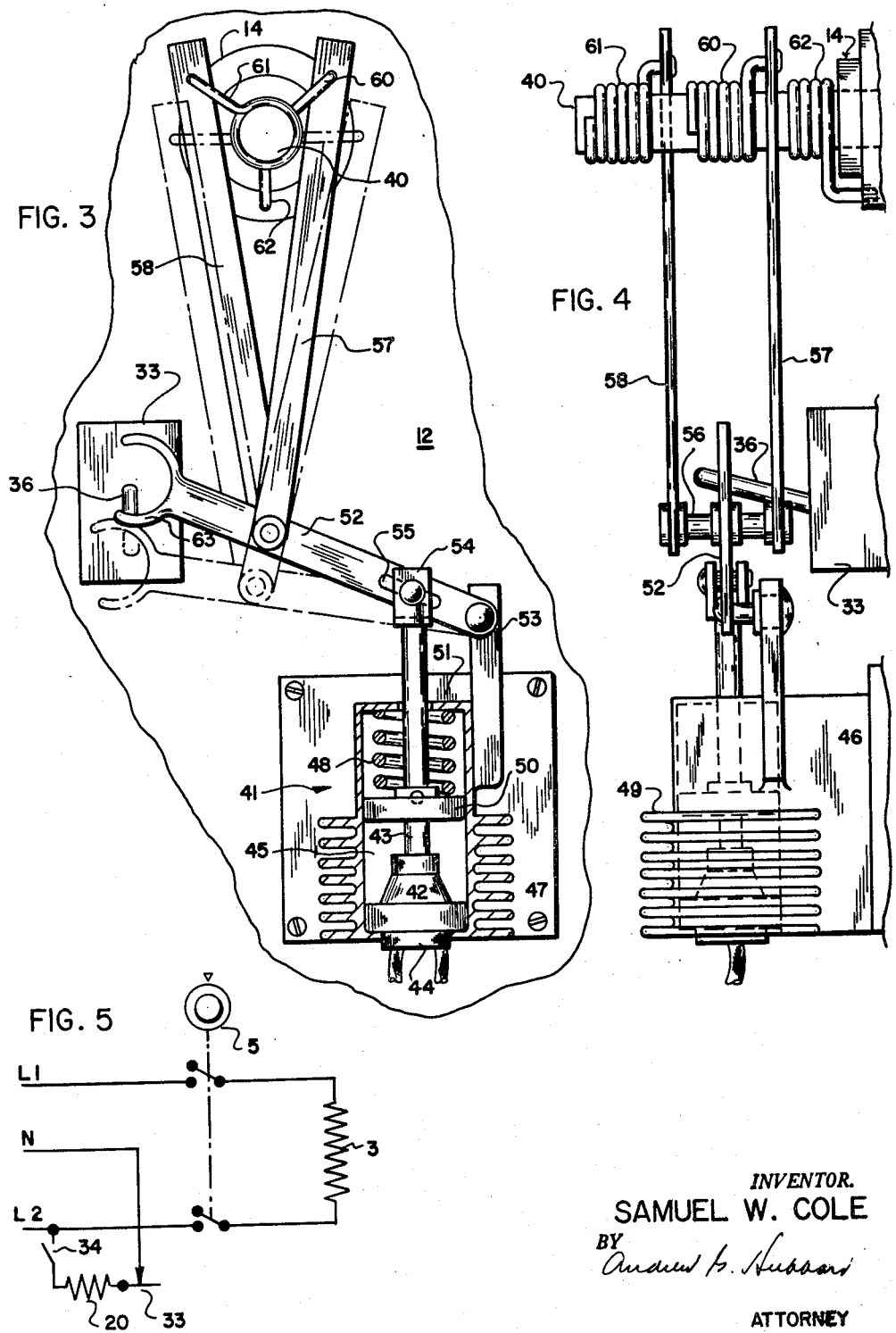

United States Patent Office 3,184,914
Patented May 25, 1965

3,184,914
THERMAL MOTOR FOR ROTATING A ROTISSERIE SHAFT
Samuel W. Cole, Maywood, Ill., assignor to General Electric Company, a corporation of New York
Filed Dec. 20, 1960, Ser. No. 77,060
2 Claims. (Cl. 60—23)

This invention relates to cooking appliances and in particular to cooking appliances in which food mounted on a spit is arranged to be rotated relative to a heating element.

Because of the excellent taste and nutritional values of meat, fish, and fowl, cooked in the "rotisserie" manner, many domestic ranges are now equipped for this type of cooking. In general, the cooking operation is carried out in the oven or broiling chamber of the range in which is located a heating unit either of the electric or gas fired type disposed adjacent a wall of the chamber. In electric ranges, for example, the heating unit may be adjacent the top wall; the specific disposition of the heating unit is relatively unimportant to the present invention. A rotatable shaft provided with a socket to receive the end of the spit, is mounted in a wall of the cavity in suitable relationship to the heating element whereupon the foodstuff may be rotated at a relatively slow rate to expose all of its surfaces to the heating element.

It has been the practice to drive such a shaft by means of an electric motor having several stages of reducing gearing so as to continuously rotate the shaft at from four to six r.p.m. In general, these driving motors perform very well although they are expensive and the relatively high temperature of the ambient in which they operate complicates the problem of maintaining the reduction gearing under proper lubrication, whereupon the driving mechanism may require servicing with undesirable frequency.

I have found that it is not necessary for the spit to be rotated continuously; in fact, cooking operations are very satisfactorily performed by an intermittent or step-by-step rotation of the spit. This has made it possible for me greatly to simplify the driving mechanism and thus accomplish the primary object of the invention, which is to provide a low-cost spit driving mechanism which will operate satisfactorily over a long operating life with a minimum of service requirements.

In presently preferred forms of the invention, I utilize a thermal motor such as a heavy-duty bimetal mechanism or a so-called wax or power type thermal motor in combination with a cycling heater which periodically raises the temperature of the thermal motor and then permits it to cool to its original state. The resulting expansion and contraction of the thermal motor is made to drive a reciprocating mechanism effecting the actual rotation of the spit shaft.

Other features and advantages of the invention will be apparent from the following detailed description of presently preferred forms thereof, read in connection with the accompanying drawings in which:

FIG. 1 is a fragmentary side elevation of a domestic cooking range with the oven cavity portion in section to disclose one form of operating mechanism;

FIG. 2 is an enlarged vertical elevation of the drive mechanism used with the range of FIG. 1;

FIG. 3 is a front elevation of a second form of driving mechanism with the driving motor partly in section;

FIG. 4 is a a side elevation of the mechanism of FIG. 3;

FIG. 5 is a schematic wiring diagram; and,

FIG. 6 is a fragmentary front elevational view of another form of drive mechanism, using a solenoid as the motive power.

Referring first to FIG. 1, the range 1 illustrated therein is of the electric type in which the insulated oven cavity 2 has an upper broiling element 3 and a lower baking element 4 as is conventional in the art. The respective baking and broiling element are of the electrical resistance type and connected by conventional wiring to one or more circuit-control mechanisms 5 disposed on the backsplash 6 of the range cooking top. In the schematic wiring diagram of FIG. 5, only the broil element 3 has been shown, and those familiar with the art will recognize that the circuit-control mechanism 5 is an oversimplification. Usually, the cooking range has a plurality of surface cooking units 7. Such units do not enter into the operation of the present invention. The illustration of the oven is only to typify a chamber within which the cooking operations may take place. It will be noted that the broiler unit 3 is adjacent the top wall 8 of the cooking cavity and that a socketed drive shaft 10 projects through the rear wall 11 of the chamber. The wall 11 is apertured to permit the free rotation of the shaft 10 and an aligned aperture in the rear wall 12 accommodates a bearing 14 through which the shaft 10 extends. For purpose of illustration the bearing 14 has a relatively large flange 15 to provide for the securement of the bearing to the wall 12 and the shaft 10 is provided with a snap ring or equivalent 16 to prevent the axial movement of the shaft within the bearing while permitting the free rotation of the shaft.

Shaft 10 is arranged to be driven by a reciprocating mechanism best illustrated in FIG. 2. A bracket 17 fixed to the wall 12 of the range anchors one end of a heavy-duty bimetal element 18 which is arranged to assume the curvature shown in FIG. 2 when the bimetal member is cool and substantially to reverse its curvature when the element is heated. The heating of the bimetal member may be accomplished by a resistance heating element 20 wound thereon and, of course, suitably electrically insulated therefrom. The means for translating the expansion and contraction of the element 18 into an intermittent rotation of the shaft 10 comprises a double rack 21 guided for reciprocation in the guideways 22, 23. An extension 24 of the rack is provided with a pin 24.1 about which the free end of the bimetal element is curled so as to provide a driving connection. It should be noted that the pin 24.1 and the end of the bimetal 18 are rotatable relative to each other. The rack 21 may be stamped out of sheet metal of suitable gauge and is therefore, an inexpensive mass-produced part. It is provided with two sets of rack teeth, respectively 25 and 26, which engage in turn with a pinion 27 fixed to the end of the shaft 10. It will be noted from FIG. 2 that there is relatively little clearance between the rack teeth 26 and the pinion 27 when the pinion is in operating engagement with the rack teeth 25, and it will be understood that there is similar small clearance between the rack teeth 25 and the pinion when the latter is in operative engagement with the rack teeth 26. The purpose of this is to have one line of rack teeth remain in engagement as the other comes into play so that the rack maintains control over the pinion at all times and thus prevents any self-rotation of shaft 10 in either direction.

The rack is provided with a slot 28 within which frictionally rides a shoe 30 pivotally mounted on the end of a link 31 pivoted to the wall 12 as at an appropriate boss 32. It will be apparent that as the bimetal 18 begins its upward movement and therefore begins to raise rack 21 the friction engagement between the shoe 30 and the walls defining the slot 28 will tend to rotate the rack counterclockwise about the pin 24.1 and will, therefore, bring the rack teeth 26 into operative relationship with the pinion 27. On the downstroke, the link and shoe will transfer the rack and pinion engagement to the teeth 25. Therefore, the rack 21 rotates the pinion on the downstroke and on the upstroke.

The heating element 20 is cycled by way of a switch 33 suitably mounted on the wall 12. As best shown in FIG. 5 the switch 33 is an element in an electric power circuit of the 230 volt, three wire Edison type in which 115 volts are derived from the neutral line and the power line L2. Such circuit includes in addition to the switch 33 a manually operable switch 34 arranged on the backsplash 6 of the cooking appliance. The broiling element 3 is connected across 230 volts and is obviously under the control of the switch 5.

When the apparatus is shown in FIG. 2, it will be noted that the downstroke of the rack 21 was accomplished as the cooling bimetal 18 assumed its normal position and therefore, the switch 33 must have been in an open circuit position.

As the rack enters the completion phase of its downstroke a flexible actuator 34 adjustably mounted on a shaft 35 extending from the rack, engages the operating toggle 36 of the switch 33 to move the switch to a closed circuit position, whereupon the element 20 is energized to increase the temperature of the element 18. Said element then starts to distort in an upward direction, thus causing the rack teeth 26 to engage the pinion 27 and driving the pinion in a counterclockwise direction. Near the upper limit of rack movement the flexible lower actuator 37 engages the switch arm 36 to throw it in the upward direction to open the switch to de-energize the element 20 and thus permit the element 18 again to cool to draw the rack downwardly.

By this simple arrangement the shaft 10 is rotated in step-by-step fashion to accomplish the driving of the spit (not shown).

In the embodiment of FIG. 3, the spit-driving shaft 40 is arranged with respect to the bearing 14 and rear wall 12 of the cooking appliance in a manner substantially as described with respect to FIGS. 1 and 2. However, the shaft 40 is driven by means of a pair of spring ratchets of familiar design, whereby during the reciprocation of the driving mechanism the shaft is rotated in step-by-step fashion.

The driving motor 41 is of the well-known thermal expansion type in which the casing 42 contains a thermally expansible material of the type shown and described in the Vernet Patent 2,259,846. In its usual form, the thermal expansion material comprises a wax containing a heat conductor such as a metal powder and a binder to prevent separation of the metal powder from the wax. The thermally expansible material acts against a membrane or deformable member (not shown) as the thermally expansible material expands, to drive the piston 43 upwardly upon suitable increase in temperature of the wax. Means such as an electrical resistance element 44 is employed to provide the heat energy for operation of the motor 41. It will be understood that the heating element 44 corresponds in function to the heating element 20 of the previous embodiment.

The motor casing 42 is preferably secured within a cylindrical portion 45 of a housing 46 having a flange 47 by means of which it may be conveniently mounted against the wall 12. The housing 46 may be provided with any suitable arrangement of fins 49 to assist in dissipating the heat of the thermal motor following the interruption of energy to the heating unit 44. It will be noted that as in the FIG. 2 embodiment, the thermal motor is exposed to ambient temperature not substantially above room temperature.

It is well known that the thermal material of the Vernet type is not self-restoring, and it is the conventional practice to provide a return spring 48 or other suitable resilient device. Such a spring is compressed during the outward movement of the piston 43 and reacts to restore the piston to its home position during the cooling of the wax material. Accordingly, I provide a cup-like member 50 fixed to the piston 43 and serving to seat the spring 48 which, as indicated, also bears against the closed upper end 51 of the housing 45.

In the type and arrangement of thermal motor shown, the maximum projection of the piston 43 would be of the order of one-half inch. It is desirable to multiply this movement relative to the shaft 40, and I provide a driving lever 52 pivoted to a suitably fixed post 53. Lever 52 may be associated with the piston 43 by means of a clevis 54 having a pin riding within a suitable slot 55. Lever 52 has fixed thereto a laterally extending, double-ended shaft 56, as indicated in FIG. 4. Said shaft pivotally mounts the respective driving arms 57 and 58 which extend upwardly to embrace the shaft 40. The arm 57 operates the coil spring ratchet 60 which is arranged to grip the shaft 40 and effect a rotation thereof during the upstroke of the arm 57. The arm 58 is operatively associated with a spring ratchet 61 arranged to grip and rotate shaft 40 on the downstroke of the lever 52. It will be noted from FIG. 3 that the mechanism is at the termination of its upstroke. Obviously, the spring ratchet 61 is arranged on shaft 40 so that it relaxes on the shaft and slips during the upward movement. Similarly, the ratchet 60 relaxes during the downward movement of the arm 57. I prefer to employ a snubbing spring 62 on shaft 40 having an end fixed to the bearing 14 to restrain the free rotation of shaft 40 which might be induced by an off-center arrangement of the foodstuff being cooked.

The toggle switch 33 is substantially as shown in FIG. 2 and is operated between its open and closed circuit positions by means such as the forked end 63 of the extension of arm 52. In view of the fact that FIG. 2 represents the drive mechanism at the termination of its upstroke it will be understood that the fork 63 has operated the switch arm 36 to break the electric circuit to the heater 44. As the thermal expansion material within the motor cools, the spring 48 will drive the piston downwardly, whereupon, as the counterclockwise rotating lever 52 approaches its down position, the upper tine of the forked end of lever 52 will engage the actuator 36 to operate the switch to closed circuit position.

Thus, the heat input to the thermal motor is cycled to effect a reciprocation of the driving mechanism and a corresponding step-by-step rotation of the shaft 40.

In the embodiment of FIG. 6 the shaft driving mechanism is reciprocated by means of a solenoid 70 having the usual armature 71. The solenoid is arranged for mounting on the external wall 12 by any suitable means (not shown), and is in an electric circuit under the principal control of switch 34. A thermal time switch 72 is illustrated as the means to effect the cyclical operation of the solenoid, but, obviously, the equivalent of the switch 33 of the previous embodiments may be used. As is well known in the art a thermal switch may comprise a bimetal member 73 having an inherent bias so that its contact point 74 will engage with a fixed contact 75 when the element is cool. A resistance heater wire 76 is arranged in heat exchange relationship with the bimetal 73 and is included in an electric circuit of which the bimetal 73 provides a conductor element. As later described when the switch 34 is open and the bimetal 73 cool, no current flows through the solenoid 70 and its armature 71 is drawn out of the solenoid body. Closing the switch 34 will obviously complete the circuit through the solenoid, whereupon its armature will be drawn downwardly of FIG. 6. After an interval, however, the heating element 76 will cause the distortion of bimetal member 73 to break the solenoid energizing circuit, and the armature 71 will again be drawn upwardly.

The reciprocation of the armature 71 is translated into step-by-step rotation of the spit shaft 80 by means of an appropriate ratchet mechanism. Said mechanism comprises an eight-lobed ratchet 81 suitably pinned or fastened to shaft 80, and the pawl drivers 82 and 83 freely rotatable on a suitable extension of shaft 80. Each of the drivers has a pawl, respectively 84 and 85, which cooperates with the teeth of the ratchet to effect a driving effort. The pawl drivers are linked to an extension 86 of the armature 71 by the links 87 and 88. To withdraw the armature 71 from the solenoid coil when the latter is de-energized and to complete the stepped rotation of the shaft 80, I have illustrated conventional means such as a conical spring 90 interposed between the collar 91 pinned to extension 86, and a base 92 secured to the wall 12, or otherwise fixed relative to the solenoid 70. A stop pin 93 extending from wall 12 establishes the upper limit of movement of the armature, and is positioned to insure that the reciprocation of the armature effects the desired rotation of the spit-shaft 80.

It will be obvious that the pawl 85 is in a driving engagement with the rack 81. As the armature 71 is pulled downwardly, the pawl 85 will effect a one-sixteenth revolution of the ratchet 81, whereupon the pawl 84 engages a succeeding tooth. The ratchet 81 is, therefore, held against counterclockwise rotation and as the solenoid is de-energized, the upward drive of spring 90 effects a further one-sixteenth advance of the ratchet. The pawls are then in operative association with the ratchet teeth for the next driving operation. It will be understood that the respective pawls are biased by means of coil springs (not shown) about their pivots so as to maintain operating engagement with the ratchet 81. I prefer to have the nose of each pawl seat within a detent in the ratchet to restrain a rotation of shaft 80 which may be the result of an eccentric loading of the spit.

From the foregoing discussions, it will be apparent that each of the embodiments is characterized by components which are of simple construction and operation. With the exception of the actual motive power thereof, the components of the drive mechanisms may be of stamped metal parts, sufficiently inexpensive, per se, to be made with a very large operational safety factor. There are no critical bearings, because there is no need for precision fitting or interrelationships of the respective components. Only the embodiment of FIG. 6 provides for a predetermined or fixed stroke of the reciprocating mechanism; the other embodiments are completely tolerant of variations in operating stroke.

While there have been described what are at present considered to be the preferred embodiments of the invention, it will be understood that various modifications may be made therein, and it is intended to cover in the appended claims all such modifications as fall within the true spirit and scope of the invention.

I claim:
1. For use in a cooking appliance having a chamber provided with a spit to be rotated relative to a heating unit for cooking a foodstuff carried by said spit:
   the improvement in spit-rotating means comprising a shaft adapted to engage a spit,
   means for mounting said shaft for rotation,
   a pinion on said shaft,
   a discontinuous walking rack having two separate parallel rack members disposed on opposite sides of said pinion and alternately engageable with said pinion to rotate the same in a single direction upon reciprocation of said rack,
   a link member pivoted remote from said rack for rotation relative to said rack,
   a friction member carried by the free end of said link member in slidable frictional engagement with said rack whereby according to the direction of movement of said rack relative to the pivot point of said link member one or the other of said separate parallel rack members will be caused to operatively engage said pinion,
   means for guiding said rack for rectilinear movement relative to said pinion,
   bimetal means engaging with said rack to effect movement thereof, said bimetal means being arranged upon heating to operate the rack in one direction and on cooling to operate the rack in the opposite direction,
   electric resistance heating means disposed in heat transfer relation with said bimetal means,
   electric switch means in circuit with said heating means,
   and means to operate said switch means to closed circuit condition as said rack approaches one extremity of its movement and to open circuit condition as said rack approaches the other extremity of its movement.

2. For use in a cooking appliance having a chamber provided with a spit to be rotated relative to a heating unit for cooking a foodstuff carried by said spit:
   the improvement in spit rotating means comprising a shaft adapted to engage a spit,
   means for mounting said shaft for rotation,
   a pinion on said shaft,
   a discontinuous walking rack having two rack members disposed on opposite sides of said pinion and alternately engageable with said pinion to rotate the same in a single direction upon reciprocation of said rack,
   a link member pivoted remote from said rack for rotation relative to said rack,
   a friction member carried by the free end of said link member in slidable frictional engagement with said rack whereby according to the direction of movement of said rack relative to the pivot point of said link member one or the other of said separate parallel rack members will operatively engage said pinion,
   means for guiding said rack for rectilinear movement relative to said pinion,
   a heat motor engaging with said rack to effect movement thereof, said motor being arranged upon heating to operate the rack in one direction and on cooling to operate the rack in the opposite direction,
   electric resistance heating means disposed in heat transfer relation with said heat motor,
   electric switch means in circuit with said heating means,
   and means interposed between said rack and said switch means to cyclically operate said switch means between open and closed circuit conditions according to the direction of movement of said rack.

References Cited by the Examiner

UNITED STATES PATENTS

| | | | |
|---|---|---|---|
| 616,480 | 12/98 | Mead | 74—30 |
| 853,688 | 5/07 | Gminder. | |
| 1,354,237 | 9/20 | Boyd | 74—30 |
| 2,337,098 | 12/43 | Gomersall | 99—329 |
| 2,381,112 | 8/45 | Clark | 74—30 |
| 2,387,621 | 10/45 | Stangle | 99—397 |
| 2,391,571 | 12/45 | Hennessey | 99—421 |
| 2,487,154 | 11/49 | Lloyd | 60—23 |
| 2,565,749 | 8/51 | Zappia | 74—30 |
| 2,572,162 | 10/51 | Koonz | 60—23 |
| 2,627,755 | 2/53 | Hooker | 74—129 |
| 2,687,005 | 8/54 | Ingersoll | 60—23 |
| 2,755,619 | 7/56 | Sheft | 74—132 X |
| 2,804,012 | 8/57 | Dong | 99—421 |
| 2,813,478 | 11/57 | Popple | 99—421 |
| 2,850,870 | 9/58 | Martin | 60—23 |
| 2,985,096 | 5/61 | Wolske | 99—421 |
| 2,989,281 | 6/61 | Fritts | 60—23 X |

ROBERT E. PULFREY, *Primary Examiner.*

GEORGE NINAS, Jr., JEROME SCHNALL, LAWRENCE CHARLES, *Examiners.*